US008726227B2

(12) United States Patent
Adhikary et al.

(10) Patent No.: US 8,726,227 B2
(45) Date of Patent: May 13, 2014

(54) MODELING A GOVERNANCE PROCESS OF ESTABLISHING A SUBSCRIPTION TO A DEPLOYED SERVICE IN A GOVERNED SOA

(75) Inventors: Subrata Adhikary, Sandy Springs, GA (US); Abdul Allam, Raleigh, NC (US); Harish Bharti, Pune (IN); William A. Brown, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/882,571

(22) Filed: Sep. 15, 2010

(65) Prior Publication Data

US 2012/0066663 A1    Mar. 15, 2012

(51) Int. Cl.
*G06F 9/44* (2006.01)

(52) U.S. Cl.
USPC ......................................... 717/104

(58) Field of Classification Search
USPC ......................................... 717/104
See application file for complete search history.

(56) References Cited

U.S. PATENT DOCUMENTS

| | | | |
|---|---|---|---|
| 5,745,878 | A | 4/1998 | Hashimoto et al. |
| 6,363,393 | B1 | 3/2002 | Ribitzky |
| 6,405,364 | B1 | 6/2002 | Bowman-Amuah |
| 6,601,233 | B1 | 7/2003 | Underwood |
| 6,640,249 | B1 | 10/2003 | Bowman-Amuah |
| 7,149,699 | B2 | 12/2006 | Barnard et al. |
| 7,580,946 | B2 | 8/2009 | Mansour et al. |
| 7,614,047 | B1 | 11/2009 | Wang |
| 7,630,965 | B1 | 12/2009 | Erickson et al. |
| 7,647,627 | B2 | 1/2010 | Maida-Smith et al. |
| 7,685,604 | B2 * | 3/2010 | Baartman et al. ............. 719/313 |
| 7,720,198 | B2 | 5/2010 | Schliermann |
| 7,725,469 | B2 | 5/2010 | Colgrave et al. |
| 7,725,482 | B2 | 5/2010 | Smith et al. |
| 7,730,123 | B1 | 6/2010 | Erickson et al. |
| 7,739,228 | B1 | 6/2010 | Erickson et al. |
| 7,761,844 | B2 | 7/2010 | Bove et al. |
| 7,768,944 | B2 | 8/2010 | Hao et al. |
| 7,937,673 | B1 | 5/2011 | Kurshan et al. |
| 7,992,133 | B1 | 8/2011 | Theroux et al. |
| 2002/0120776 | A1 | 8/2002 | Eggebraaten et al. |

(Continued)

OTHER PUBLICATIONS

Nicolai M. Josuttis. "SOA in Practice",O'Reilly, Aug. 2007, First Edition.*

(Continued)

*Primary Examiner* — Li B Zhen
*Assistant Examiner* — Sen Chen
(74) *Attorney, Agent, or Firm* — Brandon C. Kennedy; John R. Pivnichny; Biggers Kennedy Lenart Spraggins LLP

(57) ABSTRACT

Modeling a governance process of establishing a subscription to a deployed service in a governed Service Oriented Architecture ('SOA') and generating, in dependence upon the modeled governance process, one or more automation modules, each automation module comprising a module of computer program instructions that, when executed by a computer processor, supports performance of one or more steps of the modeled governance process, where the modeled governance process includes collecting available service artifacts associated with a deployed service; determining whether the deployed service meets predefined functional requirements; if the deployed service meets the predefined functional requirements, determining whether the deployed service meets predefined non-functional requirements if the deployed service meets the predefined non-functional requirements, creating a subscription request; requesting approval of the subscription request; and if approval is received, creating a subscription to the deployed service.

18 Claims, 7 Drawing Sheets

(56) References Cited

U.S. PATENT DOCUMENTS

| | | | |
|---|---|---|---|
| 2002/0194053 A1 | 12/2002 | Barrett et al. | |
| 2004/0107124 A1 | 6/2004 | Sharpe et al. | |
| 2004/0193703 A1 | 9/2004 | Loewy et al. | |
| 2005/0108703 A1 | 5/2005 | Hellier | |
| 2005/0154700 A1 | 7/2005 | Lele | |
| 2005/0203784 A1 | 9/2005 | Rackham | |
| 2005/0204048 A1 | 9/2005 | Pujol et al. | |
| 2005/0222931 A1 | 10/2005 | Mamou et al. | |
| 2005/0223109 A1 | 10/2005 | Mamou et al. | |
| 2005/0232046 A1 | 10/2005 | Mamou et al. | |
| 2006/0059253 A1 | 3/2006 | Goodman et al. | |
| 2006/0080352 A1 | 4/2006 | Bourbez et al. | |
| 2006/0112122 A1 | 5/2006 | Goldszmidt et al. | |
| 2006/0155725 A1 | 7/2006 | Foster et al. | |
| 2006/0235733 A1 | 10/2006 | Marks | |
| 2006/0241931 A1 | 10/2006 | Abu el Ata et al. | |
| 2006/0271660 A1 | 11/2006 | LaJeunesse | |
| 2006/0277081 A1 | 12/2006 | Pham et al. | |
| 2007/0043724 A1 | 2/2007 | Senan et al. | |
| 2007/0069855 A1 | 3/2007 | Boland et al. | |
| 2007/0074148 A1 | 3/2007 | Morgan | |
| 2007/0143474 A1 | 6/2007 | Sheng et al. | |
| 2007/0168753 A1 | 7/2007 | Herter et al. | |
| 2007/0209059 A1 | 9/2007 | Moore et al. | |
| 2007/0220479 A1 | 9/2007 | Hughes | |
| 2007/0244904 A1 | 10/2007 | Durski | |
| 2007/0265868 A1 | 11/2007 | Rapp et al. | |
| 2007/0288275 A1 | 12/2007 | Kumar | |
| 2008/0028329 A1 | 1/2008 | Erl | |
| 2008/0028365 A1 | 1/2008 | Erl | |
| 2008/0040292 A1 | 2/2008 | Nakayashiki | |
| 2008/0046259 A1 | 2/2008 | Johnston | |
| 2008/0052314 A1 | 2/2008 | Batabyal | |
| 2008/0059378 A1 | 3/2008 | D'Alo et al. | |
| 2008/0065466 A1 | 3/2008 | Liu et al. | |
| 2008/0069082 A1 | 3/2008 | Patrick | |
| 2008/0069124 A1 | 3/2008 | Patrick | |
| 2008/0077652 A1 | 3/2008 | Grant et al. | |
| 2008/0082569 A1 | 4/2008 | Mansour et al. | |
| 2008/0126147 A1 | 5/2008 | Ang et al. | |
| 2008/0127047 A1 | 5/2008 | Zhang et al. | |
| 2008/0172269 A1 | 7/2008 | Senan et al. | |
| 2008/0172621 A1 | 7/2008 | Soroker et al. | |
| 2008/0270153 A1 | 10/2008 | Drapkin et al. | |
| 2008/0282219 A1 | 11/2008 | Seetharaman et al. | |
| 2008/0294408 A1 | 11/2008 | Padmanabhan | |
| 2008/0300933 A1 | 12/2008 | Britton et al. | |
| 2009/0043622 A1 | 2/2009 | Finlayson et al. | |
| 2009/0063171 A1 | 3/2009 | Isom | |
| 2009/0064087 A1 | 3/2009 | Isom | |
| 2009/0100491 A1 | 4/2009 | Rijssemus et al. | |
| 2009/0158237 A1 | 6/2009 | Zhang et al. | |
| 2009/0182565 A1 | 7/2009 | Erickson et al. | |
| 2009/0187823 A1 | 7/2009 | Farrell et al. | |
| 2009/0192867 A1 | 7/2009 | Farooq et al. | |
| 2009/0193057 A1 | 7/2009 | Maes | |
| 2009/0198534 A1 | 8/2009 | Brown et al. | |
| 2009/0198535 A1 | 8/2009 | Brown et al. | |
| 2009/0198537 A1 | 8/2009 | Brown et al. | |
| 2009/0198550 A1 | 8/2009 | Brown et al. | |
| 2010/0049628 A1* | 2/2010 | Mannava et al. | 705/27 |
| 2010/0057522 A1 | 3/2010 | Borowski et al. | |
| 2010/0071028 A1 | 3/2010 | Brown et al. | |
| 2010/0095266 A1 | 4/2010 | Novak | |
| 2010/0125477 A1 | 5/2010 | Mousseau et al. | |
| 2010/0138250 A1 | 6/2010 | Brown et al. | |
| 2010/0138251 A1 | 6/2010 | Brown et al. | |
| 2010/0138252 A1 | 6/2010 | Brown et al. | |
| 2010/0138254 A1 | 6/2010 | Brown et al. | |
| 2010/0146037 A1* | 6/2010 | Little | 709/203 |
| 2010/0198730 A1 | 8/2010 | Ahmed et al. | |
| 2010/0217636 A1 | 8/2010 | Channabasavaiah et al. | |
| 2010/0305994 A1 | 12/2010 | Gaskell | |
| 2012/0066145 A1 | 3/2012 | Adhikary | |
| 2012/0066146 A1 | 3/2012 | Adhikary | |
| 2012/0066147 A1 | 3/2012 | Adhikary | |
| 2012/0066663 A1 | 3/2012 | Adhikary | |
| 2012/0066671 A1 | 3/2012 | Adhikary | |
| 2012/0310710 A1 | 12/2012 | Brown et al. | |

OTHER PUBLICATIONS

Executiing SOA (Bieberstein et al., May 5, 2008, IBM).
Office Action, U.S. Appl. No. 12/025,328, Apr. 11, 2011.
Final Office Action, U.S. Appl. No. 12/233,156, Apr. 18, 2011.
"A Practical Service Oriented Architecture", MDH Project Architecture Team, Vers. 1.0, Oct. 2007.
Mohamad Afshar, SOA Governance: Framework and Best Practices, Version 1.1 (May 2007).
Bass, Clements, Kazman, "Software Architecture in Practice, Second Edition", (Apr. 9, 2003).
Notice of Allowance, U.S. Appl. No. 12/025,328, May 25, 2012.
Final Office Action, U.S. Appl. No. 12/327,029, Apr. 6, 2012.
Final Office Action, U.S. Appl. No. 12/326,412, Mar. 26, 2012.
Final Office Action, U.S. Appl. No. 12/326,390, Jan. 20, 2012.
Final Office Action, U.S. Appl. No. 12/326,354, Oct. 11, 2011.
Office Action, U.S. Appl. No. 12/024,746, Jun. 10, 2011.
Office Action, U.S. Appl. No. 12/025,340, Jun. 13, 2011.
Office Action, U.S. Appl. No. 12/326,354, Jun. 8, 2011.
White et. Al. "How Computers Work", Que, Oct. 2003, 7$^{th}$ Edition.
Office Action, U.S. Appl. No. 12/326,390, Jul. 19, 2011.
Office Action, U.S. Appl. No. 12/327,029, Dec. 3, 2008.
Office Action, U.S. Appl. No. 12/326,412, Dec. 2, 2008.
Advisory Action, U.S. Appl. No. 12/327,029, Jun. 19, 2012.
Office Action, U.S. Appl. No. 12/882,662, Nov. 26, 2012.
Office Action, U.S. Appl. No. 13/572,670, Nov. 26, 2012.
"SOA Governance: Framework and Best Practices", an Oracle White Paper, May 2007.
"SOA Practitioner's Guide: Part I Why Services-Oriented Architecture?", Sep. 15, 2006.
Executing SOA: A Practical Guide for the Service-Oriented Architect (Bieberstein et al, May 5, 2008).
Office Action, U.S. Appl. No. 12,024,772, Jan. 22, 2010.
Final Office Action, U.S. Appl. No. 12,024,772, Jun. 10, 2010.
Office Action, U.S. Appl. No. 12/233,156, Nov. 15, 2010.
Final Office Action, U.S. Appl. No. 13/572,670, Apr. 11, 2013.
Nicola M. Josuttis. "SOA in Practice", O'Reilly, Aug. 2007, First Edition.
Office Action, U.S. Appl. No. 12/882,571, Jan. 7, 2013.
Office Action, U.S. Appl. No. 12/882,607, Jan. 18, 2013.
Office Action, U.S. Appl. No. 12/882,745, Jan. 7, 2013.
Office Action, U.S. Appl. No. 12/882,774, Dec. 18, 2012.
Afshar, M., et al., "SOA Governance: Framework and Best Practices", An Oracle White Paper, May 2007, pp. 1-22, Version 1.1, Oracle Corporation, Redwood Shores, CA, USA.
Bass, Clements, Kazman, "Software Architecture in Practice, Second Edition", (Apr. 9, 2003), 1 page.
Bieberstein, N., et al., "Executing SOA: A Practical Guide for the Service-Oriented Architect", May 5, 2008, pp. 1-27, ibmpressbooks.com, IBM Press.
Brown, W., et al., "SOA governance: how to oversee successful implementation through proven best practices and methods", Effective governance through the IBM SOA Governance Management Method Approach White paper, pp. 1-48, Aug. 2006.
Burns, et al., "The Essentials of an SOA COE", Oct. 27, 2004, pp. 1-16, IBM Global Services.
Cherbakov, et al., "Impact of Service Orientation at the Business Level", IBM Systems Journal, Dec. 1, 2005, pp. 1-14, IBM SJ 44-4, IBM.
Durvasula, S., et al., "SOA Practitioners' Guide Part I Why Services-Oriented Architecture?", Sep. 15, 2006, pp. 1-18, URL: http://www.soablueprint.com/whitepapers/SOAPGPart1.pdf.
Erradi, A., et al., "SOAF: An Architectural Framework for Service Definition and Realization", IEEE International Conference on Services Computing (SCC'06), pp. 1-8, 2006 IEEE.
Ferguson, et al., "Service-Oriented Architecture: Programming Model and Product Architecture", IBM Systems Journal, Oct. 21, 2005, pp. 1-24, IBM SJ 44-4, IBM.

(56) References Cited

OTHER PUBLICATIONS

Freeland, J., "The New CRM Imperative," Ultimate CRM Handbook, McGraw-Hill, Chapter I, pp. 3-9, Sep. 24, 2002, Edition: 1.

Holley, K., "IBM Assessments for Service Oriented Architecture", 2004, pp. 1-15, IBM Corporation.

Inaganti, S., et al., "SOA Maturity Model", Apr. 2007, BPTrends, pp. 1-23, www.bptrends.com.

Proquest, "COBIT 4.0: Major Update to International Standard Helps Businesses Increase IT Value, Decrease Risk", PR Newswire Europe Including UK Disclose, Dec. 14, 2005, pp. 1-3, New York.

Veryard, R., "The Component-Based Business: Plug and Play", Springer-Verlog, London 2001, pp. 1-237, Practitioner series ISSN 1439-9245, ISBN 1-85233-361-8 Springer-Verlag London Berlin Heidelberg.

White, R., et. al. "How Computers Work", Que, Oct. 2003, pp. 1-65, 7th Edition.

IBM, Business Consulting Services, "Assessment for AllAmerica Service Oriented Architecture", Jun. 23, 2004, pp. 1-10, IBM Corporation.

IBM, Business Consulting Services, "AVIS Futures SOA Assessment IBM Assessments for Service Oriented Architecture", Jun. 29, 2004, pp. 1-36, IBM Corporation.

IBM, Business Consulting Services, "Establish SOA Center of Excellence & SOA Governance", 2004, pp. 1-30, IBM Corporation.

IBM, Business Consulting Services, "IBM Assessments for Service Oriented Architecture", 2004, pp. 1-17, IBM Corporation.

IBM, Business Consulting Services, "IBM Assessments for Service Oriented Architecture part 2—criteria and leading practices", 2004, pp. 1-35, IBM Corporation.

IBM, Business Consulting Services, "Establishing SOA CoE & Governance or Need to validate the asset name and the engagement model (scope) as defined asset", 2004, pp. 1-41, IBM Corporation.

IBM, Business Consulting Services, "IBM Strategy and Planning for Services Oriented Architecture", 2004, pp. 1-37, IBM Corporation.

PR Newswire, "Mercury Unveils BTO Strategy for Service Oriented Architecture", Oct. 9, 2006, pp. 1-6, Ulitzer, Inc., URL: http://zapthink.ulitzer.com/node/281920.

PRNewswire, TIBCO Software: "TIBCO Empowers Customers With New Model for Accelerating Business Process Mangement Success", Apr. 10, 2007, pp. 1-2, PRNewswire, Accessed Aug. 6, 2012, URL: http://www.prnewswire.com/news-releases/tibco-empowers-customers-with-new-model-for-accelerating-business-process-management-success-57980817.html.

Businesswire, "Research and Markets: Cost Reduction is the Key Long-Term Driver of SOA Adoption", Feb. 15, 2007, pp. 1-3, Accessed: Aug. 6, 2012, URL: http://www.businesswire.com/portal/site/google/index.jsp?ndmViewId=news_view&newsId=20070215005402&newsLang=en.

* cited by examiner

MODELING A GOVERNANCE PROCESS OF ESTABLISHING A SUBSCRIPTION TO A DEPLOYED SERVICE IN A GOVERNED SOA

BACKGROUND OF THE INVENTION

1. Field of the Invention

The field of the invention is data processing, or, more specifically, methods, apparatus, and products for modeling a governance process of establishing a subscription to a deployed service in the governed SOA.

2. Description of Related Art

Service Oriented Architecture ('SOA') is an Architectural style that guides all aspects of creating and using business processes, packaged as services, throughout their lifecycle, as well as defining and provisioning the IT ('information technology') infrastructure that allows different applications to exchange data and participate in business processes loosely coupled from the operating systems and programming languages underlying those applications. SOA represents a model in which functionality is decomposed into distinct units (services), which can be distributed over a network and can be combined together and reused to create business applications. These services communicate with each other by passing data from one service to another, or by coordinating an activity between two or more services. The concepts of Service Oriented Architecture are often seen as built upon, and the evolution of, the older concepts of distributed computing and modular programming. Although services and a business's SOA Architecture are often strictly defined, governance of an SOA, implementation of an SOA, operation of an SOA, and management of an SOA is often not defined. A defined model of governance, however, may increase effectiveness and efficiency in implementing, operating, and managing a business's SOA, thereby providing savings to the business. Modeling and implementing governance processes of such a defined governance model may further enhance efficiency and effectiveness of implementing, operating, and managing a business's SOA.

SUMMARY OF THE INVENTION

Methods, apparatus, and products for automating a governance process of establishing a subscription to a deployed service in a governed Service Oriented Architecture ('SOA') are disclosed. In some embodiments automating the governance process includes modeling the governance process of establishing a subscription to a deployed service in the governed SOA, and generating, in dependence upon the modeled governance process, one or more automation modules, each automation module comprising a module of computer program instructions that, when executed by a computer processor, supports performance of one or more steps of the modeled governance process. In embodiments of the present invention, the modeled governance process includes: collecting available service artifacts associated with a deployed service; determining whether the deployed service meets predefined functional requirements including, performing a functional gap analysis between the collected service artifacts and the predefined functional requirements; if the deployed service meets the predefined functional requirements, determining whether the deployed service meets predefined non-functional requirements including: performing a non-functional gap analysis between the collected service artifacts and the predefined non-functional requirements; if the deployed service meets the predefined non-functional requirements, creating a subscription request; requesting approval of the subscription request; and if approval is received, creating a subscription to the deployed service.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
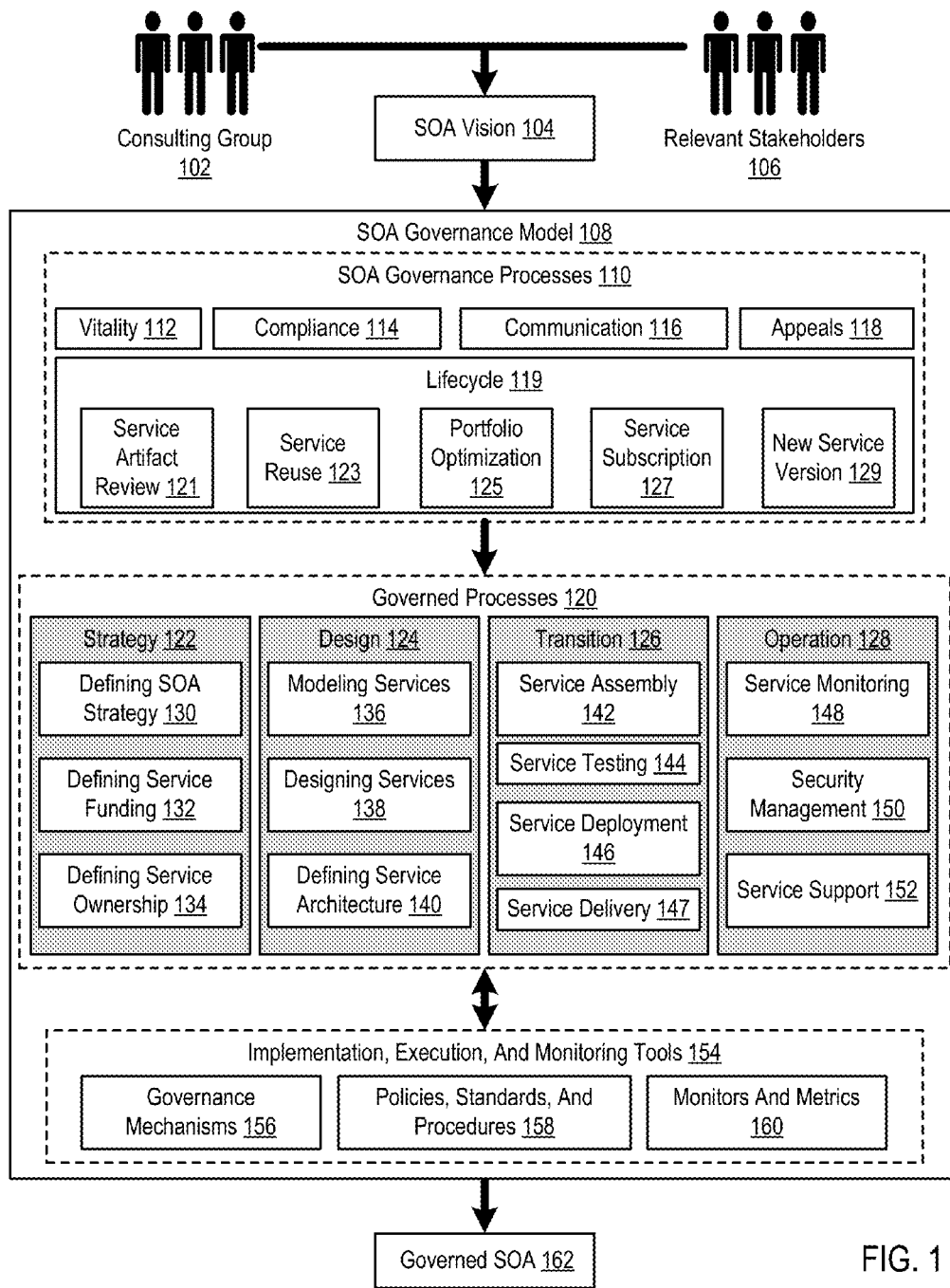
FIG. 1 sets forth a block diagram of a system for governing a Service Oriented Architecture ('SOA') according to embodiments of the present invention.

Exemplary methods, apparatus, and products for automating a governance process of establishing a subscription to a deployed service in a governed SOA in accordance with the present invention are described with reference to the accompanying drawings, beginning with FIG. 1. FIG. 1 sets forth a block diagram of a system for governing a Service Oriented Architecture ('SOA') according to embodiments of the present invention. SOA is an Architectural style that guides all aspects of creating and using business processes, packaged as services, throughout their lifecycle, as well as defining and provisioning the information technology ('IT') infrastructure that allows different applications to exchange data and participate in business processes loosely coupled from the operating systems and programming languages underlying those applications. SOA represents a model in which functionality is decomposed into distinct units, called services, which can be distributed over a network, can be combined together, and reused to create business applications. These services communicate with each other by passing data from one service to another, or by coordinating an activity between two or more services. The concepts of Service Oriented Architecture are often seen as built upon, and the evolution of, the older concepts of distributed computing and modular programming.

The system of FIG. 1 includes an SOA governance model (108) that provides parameters used in governing a business's SOA, that is, a governed SOA (162). An SOA governance model may be established through use of a consulting group (102), using software tools and business service artifacts, and relevant stakeholders (106) of a business. A consulting group may include one or more individuals that guide members of a business in establishing and implementing an SOA governance model. Such individuals typically are not members of the business. Consulting groups often work closely with relevant stakeholders of the business in establishing and implementing an SOA governance model.

A relevant stakeholder (106) of a business is an individual or party that affects, or can be affected by, a business's actions. "Relevant stakeholders," as the term is used in the specification, refers to stakeholders which are most directly affected by a business's actions with respect to SOA and often have decision making authority with regard to one or more aspects of the SOA governance model. Although only consulting groups and relevant stakeholders are described here with respect to implementing and operating a governance model in accordance with embodiments of the present invention, readers of skill in the art will immediately recognize that many other individuals or group of individuals associated with a business may take part in implementing and operating some or more aspects such a governance model and each such individual or group of individuals and their actions are also well within the scope of the present invention.

The exemplary SOA governance model (108) of FIG. 1 may be implemented and operated according to an SOA vision (104) that may be defined by the consulting (102) and the relevant stakeholders (106) of the business. That is, a consulting group may be used to guide relevant stakeholders through a process of identifying an SOA vision which may be used to define not only primary boundaries of the business's SOA, but also a governance model for the SOA. An SOA vision (104) is a general and broad definition of an SOA strategy to be accomplished through use of an SOA. An example of such an SOA strategy which may be accomplished through use of an SOA, is to reduce redundancy in the use of different software applications that provide similar functionality to different organizational entities of the business.

Consider, for example, that a retail sales department and an online sales department use different software applications to provide the similar function of receiving and processing customer orders. An SOA vision may outline business goals of the SOA that may be implemented that reduce such redundancy by providing a single service of customer order receipt and processing to both the retail sales department and the online sales department of the business.

As mentioned above, an SOA governance model (108) provides parameters used in governing a business's governed SOA (162). To that end, the exemplary SOA governance model (108) of FIG. 1 includes several SOA governance processes (110). An SOA governance process (110) is a processes that when executed governs one or more governed SOA processes (110), the processes typically used in implementing, operating, maintaining, and managing an SOA for a business. That is, the governance processes, when executed, effect governance of the typical implementation, operation, maintenance, and management of an SOA for a business.

The exemplary SOA governance model (108) of FIG. 1 the SOA includes a vitality (112) governance processes, a compliance (114) governance process, a communication (116) governance process, an appeals (118) governance process, and a lifecycle (119) governance process. The vitality (112) governance process maintains the applicability of the SOA governance model. The vitality process ensures that the governance model is current, reflecting current business and information technology and strategy, and also refines other governance processes and governance mechanisms to ensure continued usage and relevance of the governance model.

The compliance (114) governance process governs the review and approval processes used in implementing and managing services within an SOA. The governance processes includes providing criteria defined in the establishment of an SOA governance model to guide such review and approval processes. Such criteria may include a business's principles, standards, defined business roles, and responsibilities associated with those defined business roles.

The communication (116) governance process governs communication of SOA vision, SOA plans, and the SOA governance model to members of the business for educating such members. The communication governance process ensures that governance is acknowledged and understood throughout a business and also provides, to members of the business, environments and tools for easy access and use of information describing an SOA governance model.

The appeals (118) governance process enables members of a business to appeal SOA decisions. This appeals governance process therefore also provides exceptions to business policies, information technology policies, and other criteria that must typically be met within SOA decision-making processes.

The lifecycle governance process (119) governs the implementation and management of an SOA. Services deployed in an SOA may follow a lifecycle—a particular set of phases or stages through which the service proceeds from inception of the service to retirement or repurposing of the service. In addition, the SOA as a whole may follow a particular lifecycle. An SOA lifecycle, for example, may be an iterative process that includes modeling the SOA, assembling the SOA, deploying service in the SOA, and managing the SOA.

The example lifecycle governance process (119) includes several other governance processes—finer grain detail processes, each of which is governs a different aspect of service or SOA lifecycle. The lifecycle governance processes in the example of FIG. 1 includes a service artifact review (121) governance process, a service reuse (123) governance process, a service portfolio optimization (125) governance process, a deployed service subscription (127) governance process, and a new service version (129) governance process.

As mentioned above, each of the governance processes when executed governs one or more governed processes. A governed process is a processes used in implementing, operating, maintaining, and managing an SOA for a business. The exemplary SOA governance model (108) of FIG. 1 includes categories of governed processes (122, 124, 126, 128). Each category represents an area of SOA implementation, operation, maintenance, and management carried out by the governed processes included in the category.

The categories of governed processes in the example of FIG. 1 include strategy (122), design (124), transition (126), and operation (128). Processes included in the category of strategy (122) generally carry out an initial planning of service implementation. Examples of governed processes included in the category of strategy include a process for defining SOA strategy (130), defining service funding (132), and defining service ownership (134). Processes included in the category of design (124) generally carry out identification and definition of particular services for an SOA. Examples of governed processes included in the category of design include a process for modeling services (136), designing services (138), and defining service Architecture (140). Processes included in the category of transition (126) generally carry out implementation of services in an SOA. Examples of governed processes included in the category of transition (126) include a process for service assembly (142), service testing (144), service deployment (146), and service delivery (147).

Processes included in the category of operation (128) generally carry out management and monitoring of services operating within an SOA. Examples of governed processes included in the category of operation (128) include a process for service monitoring (148), security management (150), and service support (152).

The SOA governance processes (110) of FIG. 1 are executed and implemented by one or more implementation, execution and monitoring tools (154). Such implementation tools may include governance mechanisms (156). Governance mechanisms (156) may include one or more individuals, organizational entities, and business infrastructure to carry out governance according to the governance model (108). Such individuals may include relevant stakeholders, committees, or boards responsible for carrying out such governance. Organizational entities may include, for example, a board of directors, management groups, departments within a business, and the like. Business infrastructure may include available human labor, software applications, database management systems, computer technology, funding, and other types of business infrastructure as will occur to those of skill in the art. Different governance mechanisms (156) may be responsible for carrying out governance of different categories (122,124,126,128) of governed processes (120).

Other exemplary implementation and execution tools (154) in the exemplary system of FIG. 1 include policies, standards, and procedures (158). Policies, standards, and procedures (158) are embodiments of a business's overall business principles and are typically used in guiding decision-making in many of the governed processes (120). That is, policies, standards, and procedures (158) are compliance requirements, defined according to the business's SOA.

Other exemplary implementation, execution, and monitoring tools (154) in the exemplary system of FIG. 1 include monitors and metrics (160). Monitors are typically used to gather data describing performance of governed processes (120) and SOA governance processes (110). The data describing performance of governed processes and SOA governance processes may be compared to specified metrics in order to determine whether the performance of the governed processes and SOA governance processes is weak or strong. The metrics may also be used to identify particular steps of governed processes (120) and SOA governance processes (110) are ripe for improvement. As such monitors and metrics may be used to increase the efficiency and overall effectiveness of not only the governed processes typically used in implementing, operating, maintaining, and managing an SOA (162), but may also be used to increase the efficiency and overall effectiveness of the SOA governance processes (110) that govern such governed processes (120).

The arrangement of governance processes, governed processes, implementation and execution tools making up the exemplary system illustrated in FIG. 1 are for explanation, not for limitation. Systems useful according to various embodiments of the present invention may include additional computer technology, software applications, servers, routers, devices, Architectures, organizational entities, and business members not shown in FIG. 1, as will occur to those of skill in the art. Networks in such systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms.

Each of the governance processes (110) in the example of FIG. 1 may be automated to some extent. A process may be 'automated' in that the process is carried out, at least in part, by operation of computer hardware and software. For further explanation, therefore, FIG. 2 sets forth a block diagram of automated computing machinery comprising an exemplary computer (252) useful in automating a governance process of establishing a subscription to a deployed service in a governed SOA according to embodiments of the present invention. The computer (252) of FIG. 2 includes at least one computer processor (256) or 'CPU' as well as random access memory (268) ('RAM') which is connected through a high speed memory bus (266) and bus adapter (258) to processor (256) and to other components of the computer (252).

Stored in RAM (268) is a process modeling and automation tool, a module of computer program instructions for automating governance processes in accordance with embodiments of the present invention. Examples of process modeling and automation tools which may be enhanced to automate governance processes in accordance with embodiments of the present invention include business process modeling ('BPM') tools. Some BPM tools enable a user to model processes through use of Business Process Execution Language—BPEL. BPEL is short for Web Services Business Process Execution Language (WS-BPEL), an executable language for specifying interactions with Web Services. WS-BPEL provides a language for the specification of Executable and Abstract business processes. By doing so, WS-BPEL extends the Web Services interaction model and enables it to support business transactions. WS-BPEL defines an interoperable integration model that facilitates the expansion of automated process integration both within and between businesses.

Figure 2:
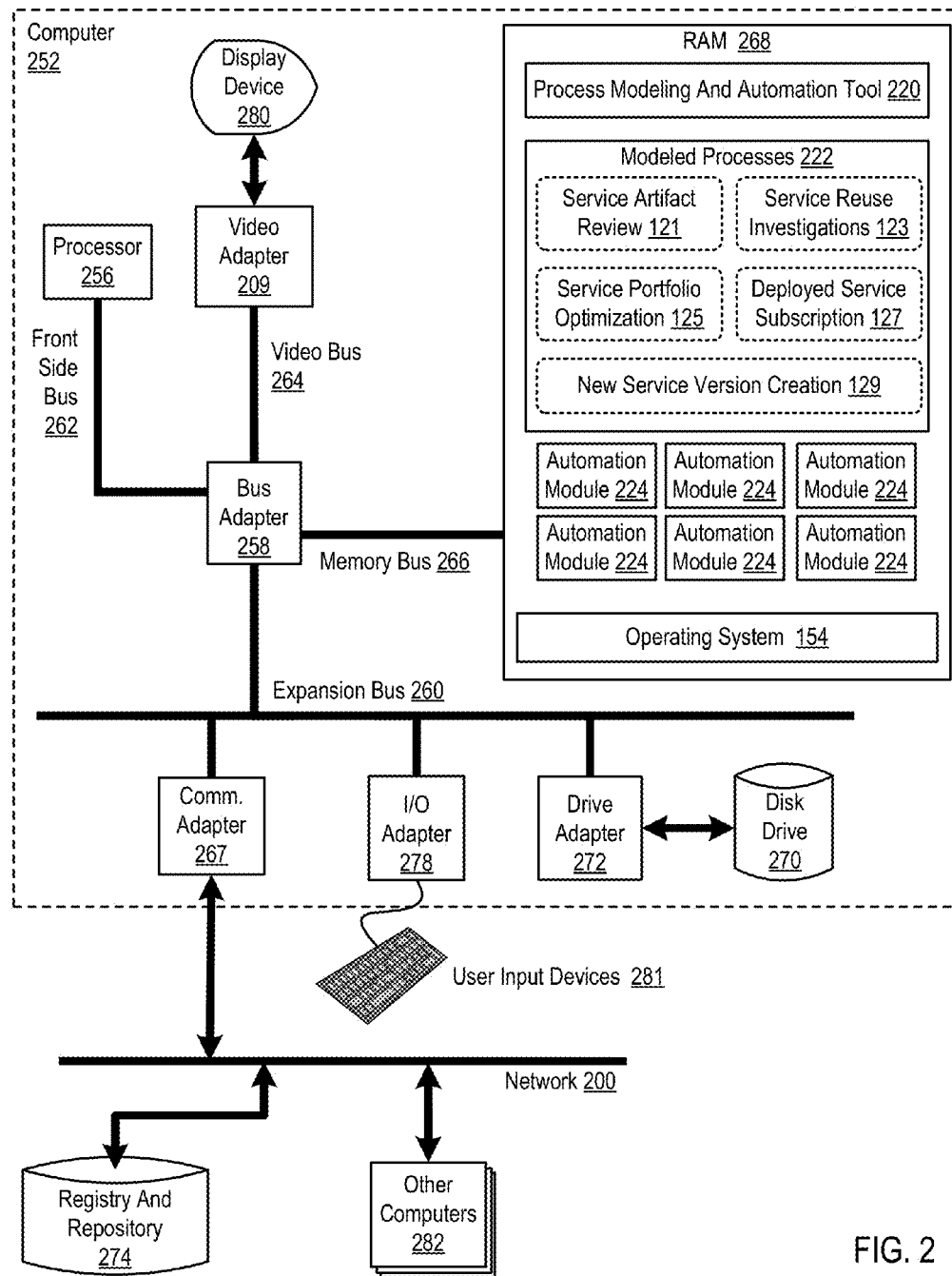
FIG. 2 sets forth a block diagram of automated computing machinery comprising an exemplary computer useful in automating a governance process of establishing a subscription to a deployed service in a governed SOA according to embodiments of the present invention.

In the example of FIG. 2, the process modeling and automation tool (220) may be configured to model a governance process (222) and generate, in dependence upon the modeled governance process (222), one or more automation modules (224), each automation module comprising a module of computer program instructions that, when executed by a computer processor (256), supports performance of one or more steps of the modeled governance process. The automation modules (224) may be executable code of a web service, executable code that receives and passes along email messages to pre-defined recipients, executable code that retrieves or stores service artifact data in databases, a plug-in to a web browser, database manager, email client, word processing applications, spreadsheet applications, and so on as will occur to readers of skill in the art—any type of module of computer program instructions which may aid in the carrying out of a governance process. The automation modules may deployed on the computer (252), on other computers (282) coupled to the computer (252) via a data communications network (200) including servers, on hand held devices such as mobile phones, personal digital assistants ('PDAs'), and so on.

In the example of FIG. 2, the process modeling and automation tool (222) has modeled five governance processes (222). The service artifact review (121) governance process included preparing one or more service artifacts associated with the service for review, submitting the service artifacts for review, and reviewing the service artifacts. The service reuse investigations (123) governance process includes receiving a specification of service requirements, interpreting the service requirements against a registry and repository (274) of deployed services including determining whether a deployed service meets the service requirements, and if a deployed service meets the requirements, initiating a subscription to the deployed service.

The service portfolio optimization (125) governance process includes determining whether a collection of service artifacts matches one or more service artifacts stored in registry and repository (274); if no service artifacts stored in the registry and repository (274) match the collection of service artifacts, initiating creation of a service in accordance with the collection of service artifacts; if one or more service artifacts stored in the registry and repository (274) match the collection of service artifacts: selecting, in dependence upon predefined action selection criteria, a service administration action to perform; obtaining approval of the selected service administration action; and initiating the selected service administration action.

The deployed service subscription (127) governance process includes: collecting available service artifacts associated with a deployed service; determining whether the deployed service meets predefined functional requirements including, performing a functional gap analysis between the collected service artifacts and the predefined functional requirements; if the deployed service meets the predefined functional requirements, determining whether the deployed service meets predefined non-functional requirements including: performing a non-functional gap analysis between the collected service artifacts and the predefined non-functional requirements; if the deployed service meets the predefined non-functional requirements, creating a subscription request; requesting approval of the subscription request; and if approval is received, creating a subscription to the deployed service.

The new service version creation (129) governance process includes reviewing requested updates to a deployed service; determining, in dependence upon the requested updates and a specification of a present version of the deployed service, whether a new version of the deployed service is required; if a new version of the deployed service is required, determining whether the present version of the deployed service will be subsumed by the new version; and if the present version of the deployed service will be subsumed by the new version, retiring the present version of the deployed service.

The example computer (252) is coupled via the data communications network (200) to a registry and repository (274). A registry is a storage location for references to other items, like pointers in computer program instructions. The example registry of FIG. 2 may include references to services, references to automation modules that implement business processes, references to service artifacts, references to documents, references to spreadsheets, and so on. The registry may also be implemented as or include a web services registry listing all publicly accessible (within a business or outside of a business organization) web services implemented in an SOA or non-deployed web services. A repository, rather than storing references to object, instead stores the objects themselves—the modules of computer program instructions forming a service, web service, or automation module, service artifacts, documents, spreadsheets, and so on. The registry and repository (274) need not be formed of a single device, a single hard drive or network attached storage, but may be distributed among many storage devices. The registry and repository may be accessible as separate entities or as a single entity. The registry and repository may be implemented with a database which may be queried by many different relevant stakeholders.

Also stored in RAM (268) is an operating system (254). Operating systems useful automating governance processes according to embodiments of the present invention include UNIX™, Linux™, Microsoft XP™, AIX™, IBM's i5/OS™, and others as will occur to those of skill in the art. The operating system (254), process modeling and automation tool (220), automation modules (224), and modeled processes (222) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers that automate governance processes according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The exemplary computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for automating a governance process of establishing a subscription to a deployed service in a governed SOA according to embodiments of the present invention include modems for wired dial-up communications, Ethernet (IEEE 802.3) adapters for wired data communications network communications, and 802.11 adapters for wireless data communications network communications.

Figure 3:
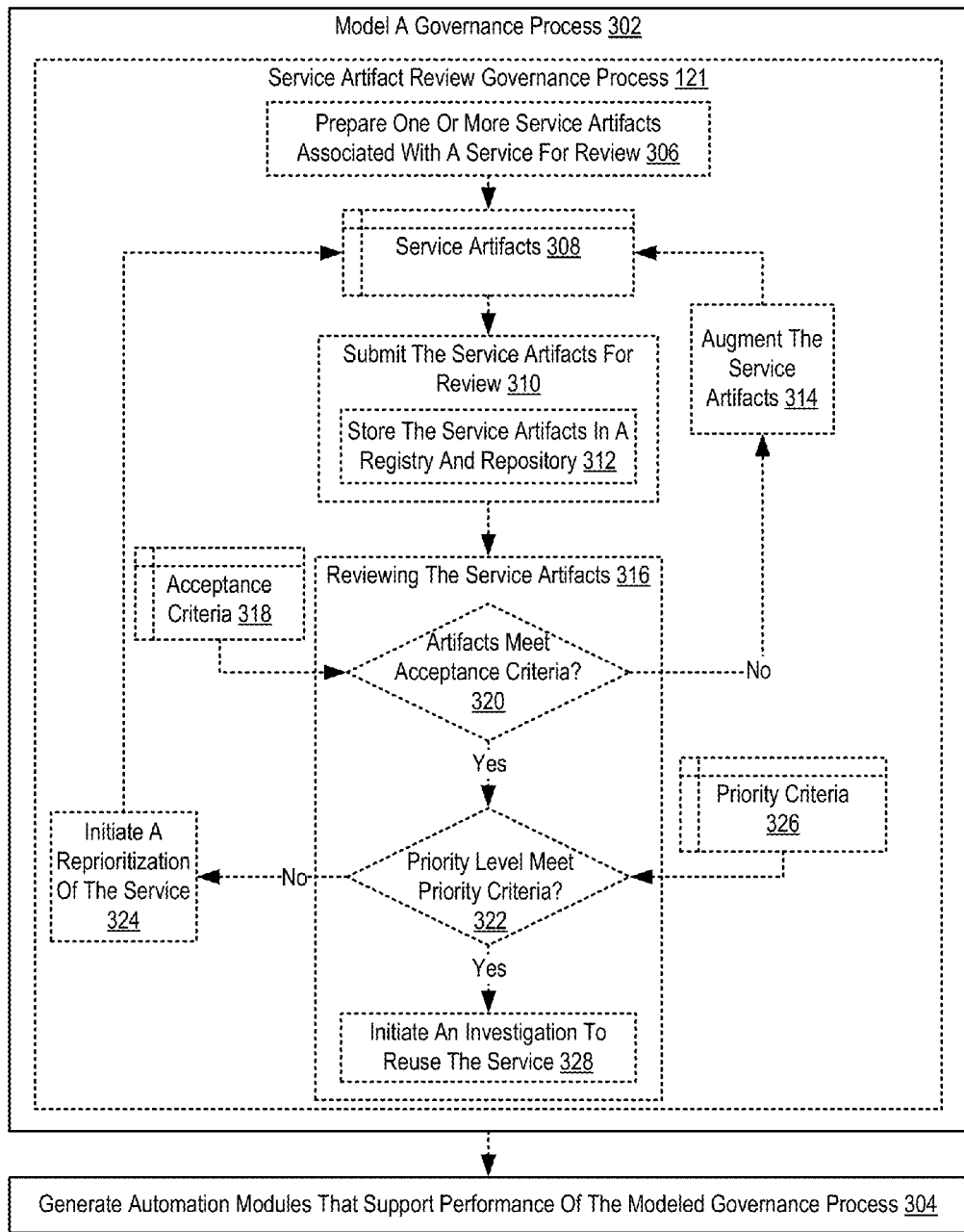
FIG. 3 sets forth a flowchart illustrating an exemplary method of automating a governance process of reviewing service artifacts in a governed SOA according to embodiments of the present invention.

For further explanation, FIG. 3 sets forth a flowchart illustrating an exemplary method of automating a governance process of reviewing service artifacts in a governed SOA according to embodiments of the present invention. The method of FIG. 3 includes modeling (302) the governance process of reviewing service artifacts associated with a service in the SOA. A governance process may be modeled in a process modeling and automation tool (called a BPM tool here for simplicity of explanation), similar to that described above with respect to FIG. 2.

A BPM tool may model a governance process by receiving a specification of steps of the process, receiving a specification of inputs for each step of the process, receiving a specification of outputs for each step of the process, and receiving a specification of a relationship (order) between steps of the process. A BPM tool may receive these specifications from various sources and various combinations of such sources—relevant stakeholders of a business, consultants, a Chief Information Officer (CIO) or Chief Executive Officer (CEO) of a business, an Information Technology ('IT') manager, a business or service Domain Owner, an SOA Center of Excellence (COE) Architect, an Application Architect, an SOA business analyst, an Architecture Review Board member, a project manager, a project leader, a technical leader, and the like. The BPM tool may receive these specifications through a graphical user interface—a flowchart-style interface, through which a user may specify the steps of the service, inputs and outputs, and relationships by defining a flowchart of the process. The BPM tool may also receive these specifications in a markup language document, such as a BPEL document, or in other ways as will occur to readers of skill in the art. Such a BPM tool enables flexibility and ease of use in specifying a governance process.

Once, the service artifact review (121) governance process is modeled, the method of FIG. 3 continues by generating (306), in dependence upon the modeled governance process (121), one or more automation modules. Each automation module may be implemented as a module of computer program instructions that, when executed by a computer processor, supports performance of one or more steps of the modeled governance process (121).

In the example of FIG. 3, the service artifact review (121) governance process—the process modeled (302) by a BPM tool or other process modeling and automation tool—includes preparing (306) one or more service artifacts (308) associated with the service for review. A service artifact (308) is object created by one or more relevant stakeholders to specify various characteristics of a service. Examples of service artifacts (308) include a document of understanding (DOU), a business requirement document (BRD), a specification of non-functional requirements, a specification of a priority of the service, and service metadata. A DOU is a document that is short in length and includes a concise description of a project (such as a project carried out or supported by operation of a service), why the project is to be carried out, and what value the project provides to an enterprise or business, and the like. A BRD is a document describing a current state of a business process (such as a process implemented with one or more services in the SOA), the intended result or results of the business process, and agreed-upon requirements of the business process. A specification of non-functional requirements sets forth requirements that aid in middle and infrastructure provisioning, capacity planning, and service reuse. An example of a specification of non-functional requirements includes a Service Level Agreement ('SLA') that may record a common understanding regarding any of quality of service, priorities, responsibilities, guarantees, warranties, and the like. A specification of a priority of the service sets forth the level of important of the service from a consumer's perspective. Examples of level of priority include "business critical," "must have," "preferred," "optional," and so on. These service artifacts may, in some embodiments, represent the minimum required number and type of service artifacts for each service. Other examples of service artifacts include:

candidate asset list;
goal service model;
service model;
process definition;
logical data model;
component business model;
enterprise information model;
project definition;
process definition;
business event list;
business rule
metadata strategy;
functional areas;
description;
glossary;
data store specification;
system context;
variations model;
use-case model;
business function/system matrix;
incremental goals;
non-functional requirements document;
business model;
innovation station record;
feasibility analysis;
non-disclosure agreement; and
clarity project.

Preparing (306) one or more service artifacts (308) may be carried out in part by any combination of a project manager, project leader, technical leader, or the like. The preparation of service artifacts may include authoring a BRD, DOU, specification of non-functional requirements, a business case for the service, and a justification to a business Domain Owner for the implementation of the service. A business Domain Owner is a person, or group of persons, having authority of a particular 'domain' of a business. Business domains are predefined categories within a business which may be defined in various ways: by subject matter, by business responsibilities, and so on as will occur to readers of skill in the art. The lifecycle of a service in an SOA may be the responsibility of a particular business Domain Owner for various reasons, one of which is that the members of the business domain are the primary consumers of the service.

Preparing (306) service artifacts is said to be carried out "in part" by a project manager, project leader, technical leader, or the like in that automation modules may also carry out some part of the preparation. Consider, for example, an automation module that supports preparation of service artifacts implemented as plug-in for a word processing application. Such a plug-in may be enable direct access to templates of BRDs, DOUs, and the like. Other automation modules which support preparation of service artifacts may also include plug-ins or applications for communicating amongst relevant stakeholders—such as the project manager, project leader, technical leader, and others—preparing the documents. Such an automation module may enable relevant stakeholders to collaborate on such service artifacts in real-time, via a web service, or iteratively via email communications. Other automation modules may, at the behest of a user, format without the user's aid the service artifacts in accordance with service artifact formatting standards. Readers of skill in the art will recognize that although on a few types of automation modules are described here, other types may also be generated to support the step of preparing (306) service artifacts for review.

The modeled service artifact review governance process (121) of FIG. 3 also includes submitting (310) the service artifacts for review. Submitting (310) the service artifacts for review may be carried out, at least in part, by the same parties responsible for preparing (306) the service artifacts—the project manager, project leader, team leader, and so on. In the example of FIG. 3, submitting (310) the service artifacts for review includes storing (312) the service artifacts in a registry and repository maintained by a service registrar. A service registrar is a relevant stakeholder of a business that is responsible for maintaining the registry and repository in an SOA.

Automation modules that support performance of submitting (310) the service artifacts for review may be generated by the method of FIG. 3. Such automation modules may be scripts, web services, executable applications, plug-ins, and so on, that provide an interface to receive service artifacts, communication or provide service artifacts to a reviewing party, store service artifacts in a registry and repository (274), or in other ways, support performance of submitting (310) service artifacts for review.

The modeled service artifact review governance process (121) of FIG. 3 also includes reviewing (316) the service artifacts. Reviewing the service artifacts may be carried out in part by a SOA Architecture Review Board (ARB) member or members, a relevant stakeholder responsible for insuring adherence to Architectural guidelines and policies of services in an SOA. In the example of FIG. 3, reviewing (316) service artifacts is carried out by determining (320) whether the service artifacts meet predefined acceptance criteria (318). Predefined acceptance criteria (318) specify a standard which service artifacts must meet in order to be approved. Such acceptance criteria may specify, for example, types of service artifacts necessary for each service, a minimum and maximum number of words of each service artifact, sufficiency of explanations or descriptions (as the service artifacts requires), and so on. In this way, the governance process of reviewing service artifacts, when executed, insures that service artifacts of all services deployed in an SOA meet a predefined standard.

In the example of FIG. 3, if the service artifacts do not meet the predefined acceptance criteria (318), the example service artifact review governance process (121) of FIG. 3 continues by augmenting (314) the service artifacts. Augmenting the service artifacts, may be carried out in part by the project manager, technical leader, or project leader responsible for initially preparing (306) the service artifacts and may include creating additional service artifacts, supplementing descriptions, explanations, and the like of the initially prepared and submitted service artifacts, and so on as will occur to readers of skill in the art. Once augmented, the service artifacts may again be submitted (310) and reviewed (316).

In the example of FIG. 3, if the service artifacts meet the predefined acceptance criteria (318), the example service artifact review governance process (121) continues by determining (322) whether the priority of the service meets predefined priority criteria. Predefined priority criteria represent a standard for assigning priority to a service. Such predefined priority criteria may include business rating criteria, business justification, one or more service level agreements, and so on as will occur to readers of skill in the art. An ARB member or members may, in part and with the support of one or more automation modules generated by the method of FIG. 3, carry out the determination (322) of whether the priority of the service meets the predefined priority criteria.

If the priority of the service meets the predefined priority criteria, the example service artifact review governance process (121) of FIG. 3 continues by initiating (328) an investigation into reusing the service (if the service is currently not deployed). Initiating (328) such an investigation may be carried out in part by one or more ARB members with support of one or more automation modules generated by the method of FIG. 3. The automation modules support the step of initiating (328) an investigation to reuse the service associated with the service artifacts may provide communications between the ARB member and the relevant business member responsible for investigating service reuse.

If the priority of the service does not meet the predefined priority criteria (327), however, the example service artifact review governance process (121) of FIG. 3 continues by initiating (324) a reprioritization of the service. The one or more ARB members may communicate the failure of the service priority to the meet the predefined priority criteria to the business Domain Owner responsible for the service through use of one or more automation modules generated by the method of FIG. 3. The business Domain Owner may then reprioritize the service.

Once modeled and once automation modules are generated, the service artifact review governance process (121) in the example of FIG. 3 may be executed in accordance with the steps described above. Such a governance process formal automated review of a service's service artifacts to insure the presence and adequacy of the service artifacts and to insure that documentation of service is well formed. These service artifacts may be utilized in many processes by many users and modules throughout the entire lifecycle of a service and of an SOA. As such, standardized service artifacts increase efficiency of planning, defining, implementing, managing, and operating a service and an SOA.

Figure 4:
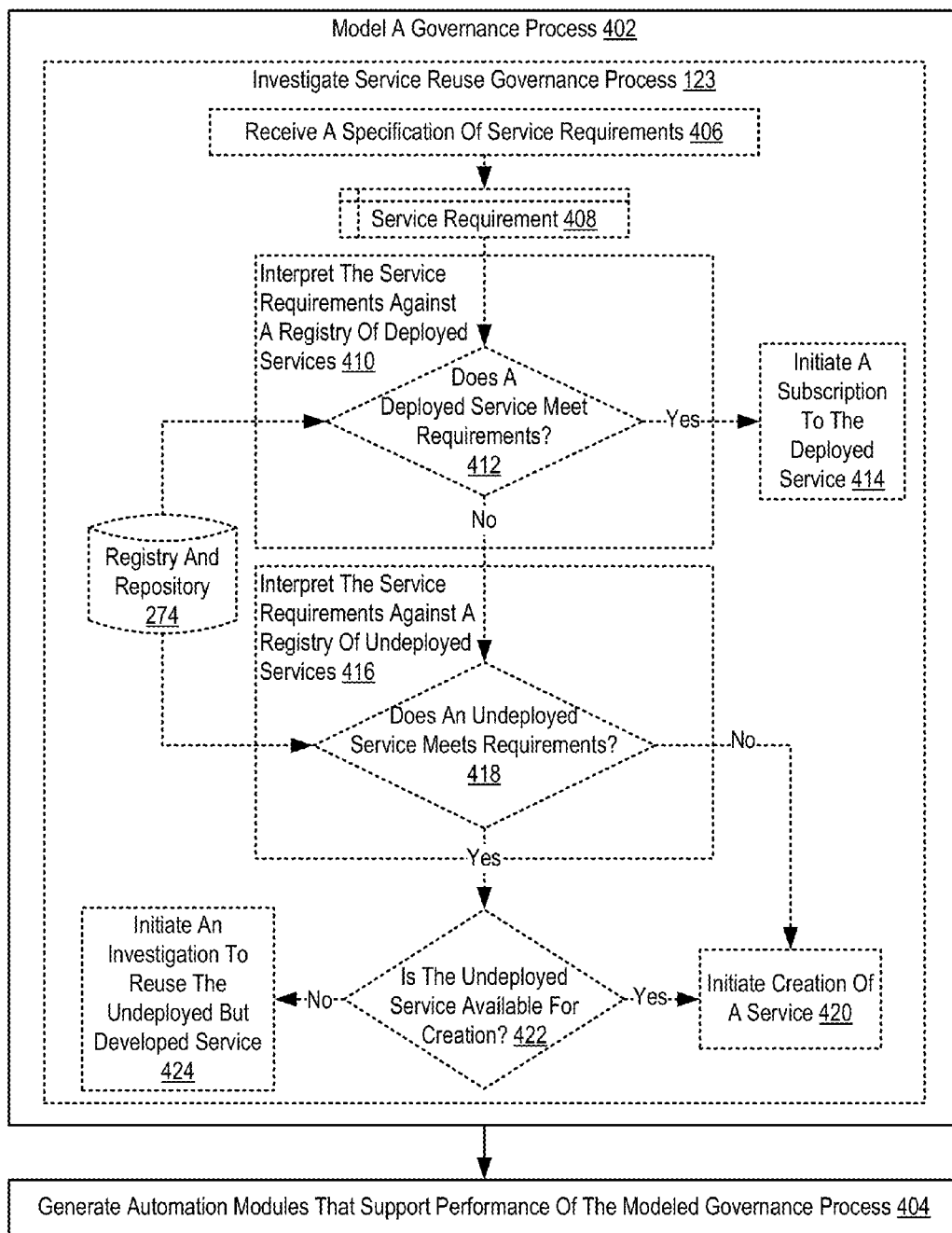
FIG. 4 sets forth a flowchart illustrating an exemplary method of automating a governance process investigating service reuse in a governed SOA according to embodiments of the present invention.

For further explanation, FIG. 4 sets forth a flowchart illustrating an exemplary method of automating a governance process investigating service reuse in a governed SOA according to embodiments of the present invention. The method of FIG. 4 includes modeling (402) the governance process (123) of investigating service reuse and generating (404), in dependence upon the modeled governance process (123), one or more automation modules. In the example of FIG. 4, each automation module may be implemented as a module of computer program instructions that, when executed by a computer processor, supports performance of one or more steps of the modeled governance process (123).

In the example of FIG. 4, the modeled governance process (123) of investigating service reuse includes receiving (406) a specification of service requirements (408). Receiving (406) a specification of service requirements (408) may be carried out in part by a relevant stakeholder having the responsibility to insure efficient Architecture of the SOA and services deployed in the SOA, such as a an SOA Center of Competency (COC) Architect. Receiving (406) a specification may be supported by execution of one or more automation modules generated (404) by the method of FIG. 4 in various ways, including automation modules that communicate documents including the specification (408) from one or more relevant stakeholders responsible for the creation of such a specification to the SOA COC Architect.

The example modeled governance process (123) of investigating service reuse in the example of FIG. 4 also includes interpreting (410) the service requirements against the registry and repository (274) of deployed services, sometimes called a 'public' registry. The term 'public' refers to the fact that services listed in the public registry may be identified by any or most members of an enterprise or business. By contrast, a private registry—a registry of undeveloped, underdeveloped, or developed but not yet deployed services—may list services not immediately accessible by all members of the enterprise. In the example of FIG. 4, interpreting (410) the service requirements against the public registry includes determining (412) whether a deployed service—a service listed in the public directory—meets the service requirements. Interpreting (410) the service requirements and determining (412) whether a deployed service meets the service requirements may be carried out in part by the SOA COC Architect or the like and may be supported by execution of one or more automation modules generated by the method of FIG. 4. One or more automation modules may, for example, provide, through one or more web services, a database query graphical user interface (GUI) to the SOA COC Architect and may also provide querying services to the Architect. Such a querying service may query the registry and repository (274) to identify one or more deployed services. "Interpreting" as the term is used here may include interpreting the specification into queries for a database. Each service listed in a public registry, for example, may include a high-level description of the service. The service requirements (408) may be then interpreted into keyword queries or the like, which may be used to query the public registry to identify services having high-level descriptions that include some or all of the keywords.

Determining (412) whether a deployed service meets the service requirements may also include searching a registry and repository (274) for publicly available service artifacts meeting the service requirements where each service artifact is associated with a deployed service and describes one or more attributes of the deployed service and identifying, from publicly available service artifacts meeting the service requirements during the searching of the registry and repository, one or more candidate deployed services.

If a deployed service meets the requirements, the modeled process (123) of investigating service reuse continues by initiating (414) a subscription to the deployed service. Initiating (414) a subscription to the deployed service may in some SOAs be implemented as a governance process, such as the governance process (127) described in further detail with regard to FIG. 6. Automation modules generated (404) in accordance with the method of FIG. 4 may aid in the initiation (414) of a subscription to the deployed service in various ways as will occur to readers of skill in the art including, for example, by communication the identity of the deployed service and the service requirements (408) to a relevant stakeholder, such as an Application Architect.

If no deployed service meets the service requirements, the modeled governance process (123) of investigating service reuse in the example of FIG. 4 continues by interpreting (416) the service requirements against a registry of undeployed services. In the example governance process (123) of investigating service reuse set forth in the method of FIG. 4, interpreting (416) the service requirements includes determining (418) whether an undeployed but developed service meets the service requirements. Like the step of interpreting (412) above, an SOA COC or like, with support from one or more automation modules generated in accordance with the method of FIG. 4, may interpret (416) the service requirements against a registry of undeployed services (274) and determine (418) whether an undeployed but developed service meets the service requirements. Although a single registry and repository (274) is shown in the example of FIG. 4, readers of skill in the art will understand that such a registry and repository may be implemented in a variety of forms. In some embodiments, for example, the public registry, private registry (registry of undeployed services), and repository of services may be implemented in separate databases.

If no undeployed but developed service meets the service requirements, the modeled governance process (123) of investigating service reuse in the example of FIG. 4 continues by initiating (420) creation of a new service that meets the service requirements. Initiating (420) creation of a new service that meets the service requirements may be carried out by the SOA COC Architect or the like with the support of one or more automation modules generated (404) in accordance with the method of FIG. 4. Such automation modules may, for example, provide communication services—communicating the service specification to a relevant stakeholder responsible for creating a new service, such as an Application Architect. Creation of a new service may, in some governed SOAs, be implemented as a governance process.

If an undeployed but developed service meets the service requirements, modeled governance process (123) of investigating service reuse in the example of FIG. 4 continues by determining (422) whether the undeployed but developed service is available for service creation. An undeployed service may exist in various stages of development. If an undeployed service is at very early stages of the development, but development was halted for one or more reasons, the undeployed service may not be immediately available or, in fact, ever available for creation. One example reason development of a service may be halted, a reason which may prevent a service from ever being developed is cost—monetary cost, cost in terms of labor, or cost in terms of physical or technological infrastructure necessary to support the service, for example. In some governed SOAs, a service listed in a registry, regardless of whether the registry is public or private, may be characterized by a description of the stage of development of the service or, said another way, the 'state' of the service. In such governed SOAs, determining (422) whether the undeployed but developed service is available for service creation may include determining the state of the service.

Determining (422) whether the undeployed but developed service is available for service creation may also include searching a registry and repository (274) for non-publicly available service artifacts meeting the service requirements. Each service artifact may be associated with an undeployed but developed service and may describe one or more attributes of the undeployed but developed service. Determining (422) whether the undeployed but developed service is available for service creation may also include identifying, from non-publicly available service artifacts meeting the service requirements during the searching of the registry and repository, one or more candidate undeployed services. Automation modules generated (404) in accordance with the method of FIG. 4 may provide database query services, query GUIs and the like to support the search of the registry and repository (274).

If the undeployed but developed service is available for service creation, the modeled governance process (123) of investigating service reuse continues by initiating (420) creation of the undeployed but developed service. If, however, an undeployed but developed service is not available for service creation, the modeled governance process (123) of investigating service reuse continues by requesting (424) reuse of the undeployed but developed service. Requesting (424) reuse of the undeployed but developed service may be carried out in part by the SOA COC Architect or the like with support of one or more automation modules generated in accordance with the method of FIG. 4. In some embodiments, the request may be directed to a Domain Owner responsible for management and implementation of service in a domain that includes the undeployed but developed service.

Figure 5:
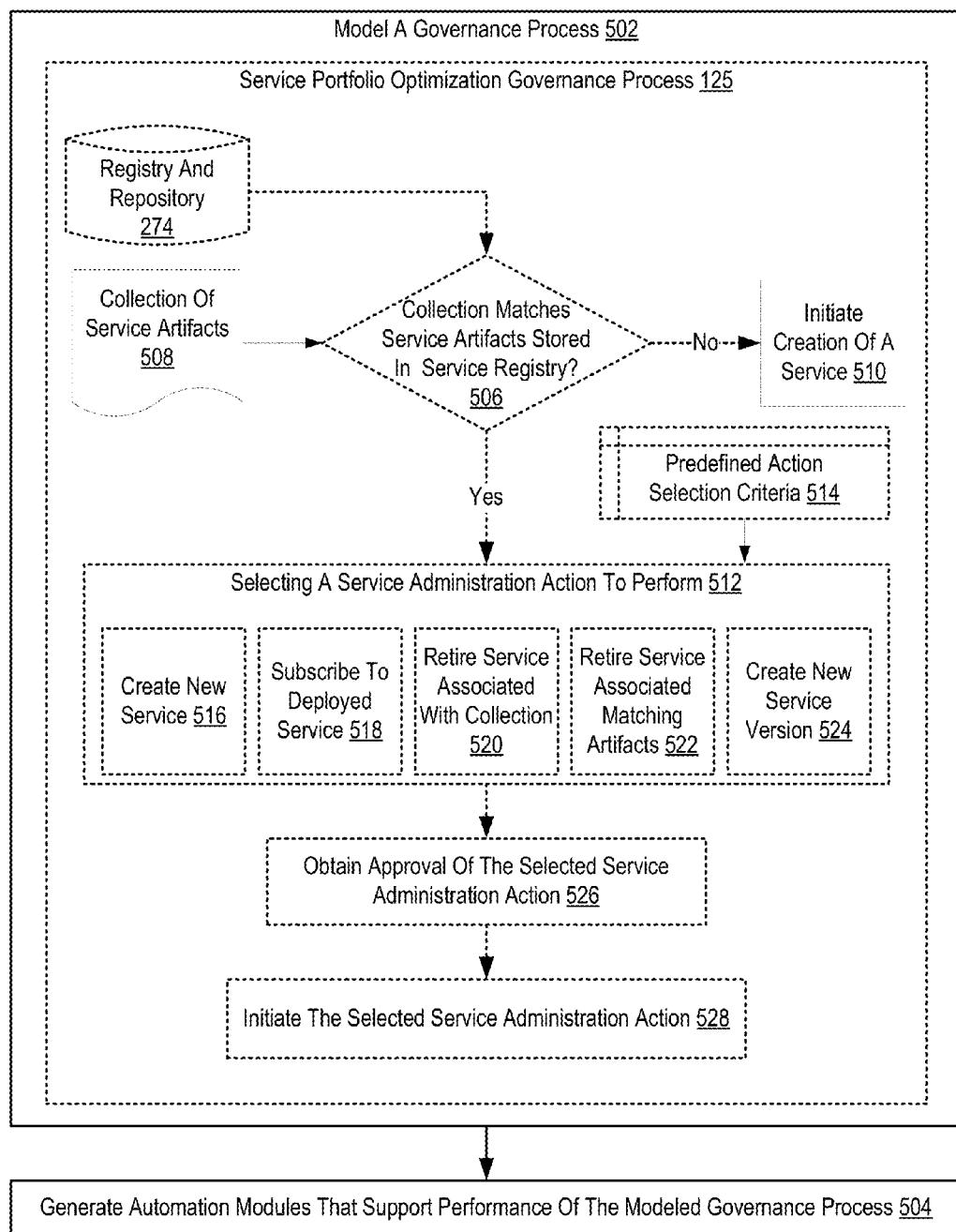
FIG. 5 sets forth a flowchart illustrating an exemplary method of automating a governance process of optimizing a portfolio of services in a governed SOA according to embodiments of the present invention.

For further explanation, FIG. 5 sets forth a flowchart illustrating an exemplary method of automating a governance process of optimizing a portfolio of services in a governed SOA according to embodiments of the present invention. The method of FIG. 5 includes modeling (502) the governance process (125) of optimizing a portfolio of services in a governed SOA and generating (504), in dependence upon the modeled governance process (125), one or more automation modules. In the example of FIG. 5, each automation module may be implemented as a module of computer program instructions that, when executed by a computer processor, supports performance of one or more steps of the modeled governance process (125).

A service portfolio may be optimized in various ways including, for example, by reducing duplication of services, reducing or retooling underutilized services, updating services, and so on. To that end, the example modeled governance process (125) of optimizing a portfolio of services includes determining (506) whether a collection of service artifacts matches one or more service artifacts stored in a service registry. The term 'matches' here means that the collection of service artifacts and one or more service artifacts stored in the service registry are substantially similar in content. The two need not exactly replicate one another verbatim to be considered a match. Determining (506) whether a collection (508) of service artifacts matches one or more service artifacts stored in a service registry may be carried out in part by a relevant stakeholder, such as a SOA ARB Architect or the like, with the support of one or more automation modules generated (504) in accordance with the method of FIG. 5. The generated automation modules may support performance of determining (506) whether a collection of service artifacts matches service artifacts stored in a service registry by providing database query, analysis and comparison tools that compare keywords of the collection of service artifacts to service artifacts listed in the registry. If service artifacts stored in the registry match a collection of service artifacts, some duplication of services may exist in the SOA. Again, due to the fact that 'matching' service artifacts need not replicate one another exactly, the existence of matching service artifacts does not necessarily mean that service duplication exists. Rather, matching service artifacts are a form of evidence that duplication may exist.

If no service artifacts stored in the service registry match the collection of service artifacts, the modeled governance process (125) of optimizing a portfolio of services continues by initiating (510) creation of a service in accordance with the collection of service artifacts. Such a creation of a service may be carried out in embodiments in which the service described by the collection of service artifacts has yet to be created. If, on the other hand, the service described by the collection of service artifacts has been created and no service artifacts in the registry and repository match the collection, no change to the portfolio of services may be necessary. That is, no other currently created service listed in the registry and stored in the repository duplicates the functionality of the service under investigation—the service described the collection of service artifacts.

If one or more service artifacts stored in the service registry does match the collection of service artifacts, however, the modeled governance process (125) of optimizing a portfolio of services continues by selecting (512), in dependence upon predefined action selection criteria (514), a service administration action (516, 518, 520, 522, 524) to perform. A service administration action is a process to be carried out that affects a particular service. In the example of FIG. 5, selecting a service administration action may be carried out in part by an SOA ARB Architect or the like and may include selecting an action of creating (516) a new service, selecting an action of subscribing (518) to a deployed service, selecting an action of retiring (520) a service associated with the collection of service artifacts, selecting an action of retiring (522) a service associated with the matching service artifacts, or selecting an action of creating (524) a new service version of a service associated with the matching service artifacts.

An action of creating (516) a new service may be selected when the service described by the collection of service artifacts is not yet created, and even in the presence of service artifacts that match the collection of service artifacts, no duplication of services in the SOA would exist if the service was created. That is, notwithstanding a match of service artifacts, the portfolio of services for the governed SOA is lacking a service that fulfills the collection of service artifacts.

An action of subscribing (518) to a deployed service may be selected in instances in which the service described by the collection of the service artifacts is not yet created and the service described by the matching service artifacts—those service artifacts stored the service registry—fulfills the requirements set forth in the collection of service artifacts. In such instances, rather than creating a new service resulting in duplication of services in the service portfolio, a prospective consumer of the service described by the collection of service artifacts may be directed to subscribe to the service described by the matching service artifacts.

An action of retiring (520) a service associated with the collection of service artifacts may be selected in instances in which the service associated with the collection of service artifacts duplicates the functionality of a service associated with the matching service artifacts. The service associated with the collection of service artifacts may be retired (rather than the service associated with the matching service artifacts) for various reasons including, for example, the breadth of documentation describing the service associated with the matching service artifacts in comparison to the collection of service artifacts. The service associated with the collection of service artifacts may also be retired, for example, if the service is less recently updated or less maintained than the service associated with the matching service artifacts. The service associated with the collection of service artifacts may also be retired, for example, if funding or infrastructure for the service is less than the service associated with the matching service artifacts. In contrast, an action of retiring (522) a service associated with the matching service artifacts (rather than the service associated with the collection of service artifacts) may be selected for the same reasons as described above.

An action of creating (524) a new service version of a service associated with the matching service artifacts may be selected when no service exactly satisfying the collection of service artifacts has been created and when the service associated with the matching service artifacts would fulfill the requirements of the collection of service artifacts, if updated.

Prior to initiating any of the service administration actions, the modeled governance process (125) of optimizing a portfolio of services includes obtaining (526) approval of the selected service administration action. Approval of the selected administration action may be requested by an SOA Architect, or the like, from a Domain Owner.

Automation modules generated (504) in accordance with the method of FIG. 5 may support performance of obtaining (526) approval of the selected service administration action by providing a means of communications—email, web services, repositories, and the like—between the SOA Architect and the Domain Owner. Such communications services may be configured to provide users with a streamlined communication in various ways including for example by providing GUIs with pre-filled forms, dynamically addressed to relevant recipients, and so on.

The modeled governance process (125) of optimizing a portfolio of services also includes initiating (528) the selected service administration action. Initiating (528) the selected service administration action may be carried out by an SOA Architect or the like through use of automation modules that provide communications means or said another way, communications channels, with relevant stakeholders responsible for carrying out the selected administration action.

The example governance process (125) of optimizing a portfolio of services may be triggered or initiated at the behest of a Domain Owner or a COC. The governance process (125) in some embodiments, identifies and address under used or obsolete services. The example governance process may also reduce the associated overhead and cost incurred by services that are redundant, under used, obsolete or not addressing specified business needs.

Figure 6:
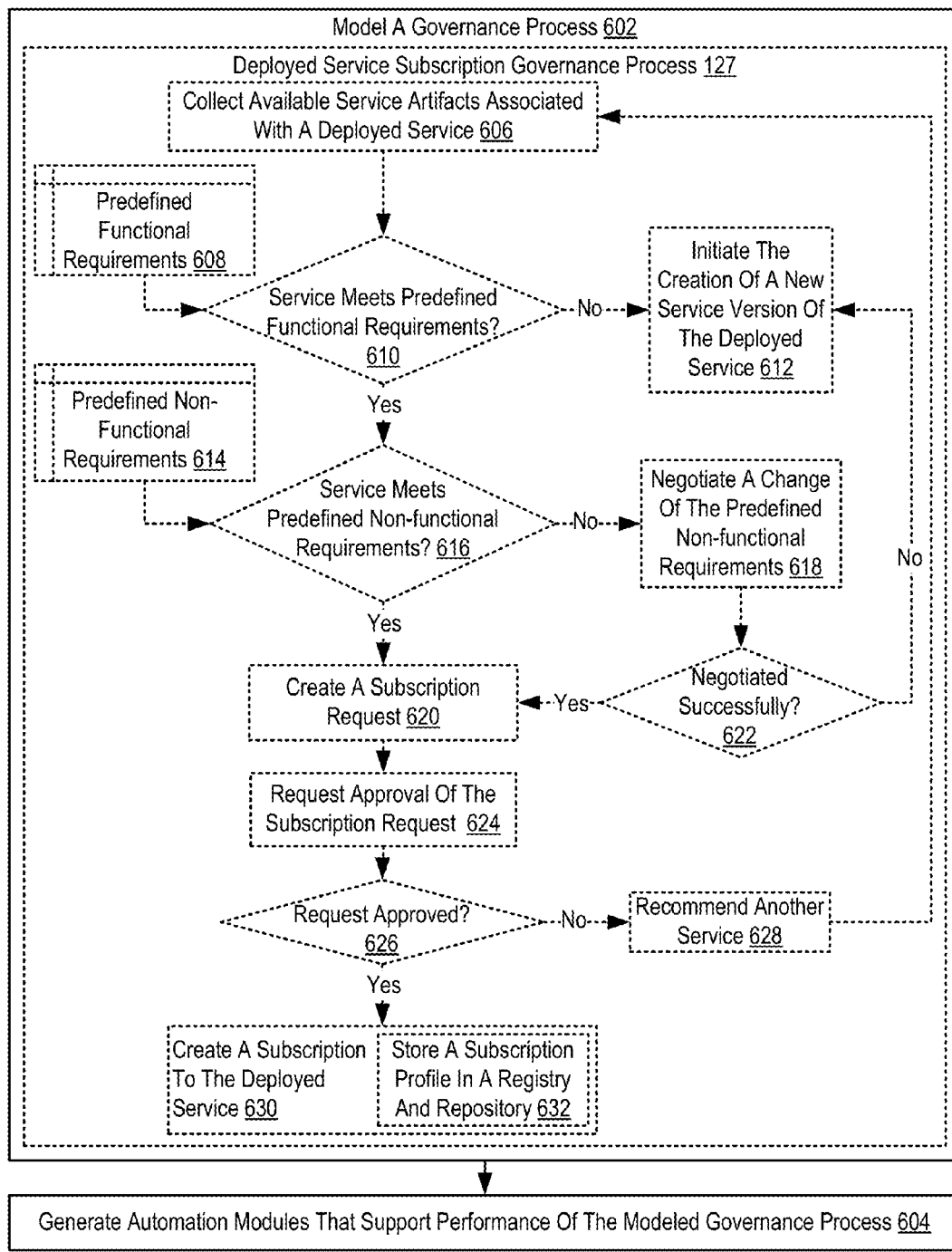
FIG. 6 sets forth a flowchart illustrating an exemplary method of automating a governance process of establishing a subscription to a deployed service in a governed SOA according to embodiments of the present invention.

For further explanation, FIG. 6 sets forth a flowchart illustrating an exemplary method of automating a governance process of establishing a subscription to a deployed service in a governed SOA according to embodiments of the present invention. The method of FIG. 6 includes modeling (602) the governance process (127) of establishing a subscription to a deployed service in the governed SOA and generating (604), in dependence upon the modeled governance process (127), one or more automation modules. In the example of FIG. 6, each automation module may be implemented as a module of computer program instructions that, when executed by a computer processor, supports performance of one or more steps of the modeled governance process (127).

In the method of FIG. 6, the example modeled governance process (127) of establishing a subscription to a deployed service in the governed SOA includes collecting (606) available service artifacts associated with a deployed service. Collecting (606) available service artifacts associated with a deployed service may include collecting one or more of: service design service artifacts, service development service artifacts, service metadata, and service run-time statistics. Collecting (606) available service artifacts may be carried out in part by an application architect or the like with support by automation modules generated in accordance with the method of FIG. 6. The application architect may utilize automation modules to search a registry and repository to identify such artifacts and retrieve the identified artifacts.

The example modeled governance process (127) of establishing a subscription to a deployed service in the governed SOA in the example of FIG. 6 also includes determining (610) whether the deployed service meets predefined functional requirements (608). A functional requirement is a specification of functionality provided by a service or, said another way, behavior of a service. Functional requirements specify how a service is to act. Functional requirements may be referred to as business requirements specified in a business case. A functional requirement is a contrast to a non-functional requirement. A non-functional requirement is a specification of a how a service is to be. Non-functional requirements often define quality attributes, quality of service, or non-behavior attributes of a service. Examples of such non-functional requirements include execution qualities, such as security and usability, observable during run-time and evolution qualities, such as testability, maintainability, extensibility, and scalability which are embodied in the structure of a service. Non-functional requirements of a service may specified or a defined a Service Level Agreement (SLA).

Determining (610) whether the deployed service meets predefined functional requirements (608) may be carried out by performing a functional gap analysis between the collected service artifacts and the predefined functional requirements. A gap analysis is a comparison of one set of data with another to identify gaps between the data sets. In some cases a gap analysis is more qualitative than quantitative due to dissimilarities in data sets. That is, rather than comparing an array of integers to another array of integers, the gap analysis may compare a set of requirements to a set of capabilities or behaviors. In the case of a functional gap analysis, for example, the predefined functional requirements and the collected service artifacts of a deployed service are compared to identify gaps between the two, and more specifically, to determine whether, and to what degree, capabilities of the service satisfy the functional requirements. The functional gap analysis is described as 'functional' because the analysis compares functional requirements rather than non-functional. A non-functional gap analysis compares non-functional requirements. Determining (610) whether the deployed service meets predefined functional requirements (608) through use of a functional gap analysis may be carried out in part by a Consumer SOA analyst and a Provider SOA analyst with support from one or more automation module generated (604) in accordance with the method of FIG. 6. A consumer, as the term is used here, refers to a consumer of a service while a provider refers to a provider of the service.

If the deployed service does not meet the predefined functional requirements, the modeled process (127) of establishing a subscription to a deployed service in the governed SOA in the example of FIG. 6 continues by initiating (612) the creation of a new service version of the deployed service, where the new service version meets the predefined functional requirements.

If the deployed service meets the predefined functional requirements, the example modeled governance process (127) of establishing a subscription to a deployed service in the governed SOA continues by determining (616) whether the deployed service meets predefined non-functional requirements (614). Determining (616) whether the deployed service meets predefined non-functional requirements (614) may be carried out by performing a non-functional gap analysis between the collected service artifacts and the predefined non-functional requirements. Performing a non-functional gap analysis may include determining whether the collective service artifacts associated with the deployed service indicate that the deployed service meets one or more criteria of an SLA. Determining (616) whether the deployed service meets predefined non-functional requirements (614) and performing a non-functional gap analysis may be carried out in part by a Provider Domain Owner and a Consumer Domain Owner with support from one or more automation module generated in accordance with the method of FIG. 6.

If the deployed service does not meet the predefined non-functional requirements, the example modeled governance process (127) of establishing a subscription to a deployed service in the governed SOA continues by negotiating (618) a change of the predefined non-functional requirements and determining (622) whether the change was successfully negotiated. Negotiating (618) a change of the predefined non-functional requirements and determining (622) whether the change was successfully negotiated may be carried out with by the Provider Domain Owner and Consumer Domain Owner. Such negotiation may include altering an SLA. Automation module generated in accordance with the method of FIG. 6, may support performance of the negotiation by providing collaboration tools through which the Provider and Consumer Domain Owners may collaboratively alter non-functional requirements.

If the negotiation (622) succeeds, the example modeled governance process (127) of establishing a subscription to a deployed service continues by initiating (612) creation of a new service version of the deployed service, where the new service version of the deployed service meets the non-functional requirements.

If the deployed service meets the predefined non-functional requirements, the example modeled governance process (127) of establishing a subscription to a deployed service in the governed SOA continues by creating (620) a subscription request. A subscription request is a data structure that specifies a subscription. Such a data structure may include any of an identification of a consumer, one or more functional or non-functional requirements, an identification of the deployed service to which the request is directed, and so on as will occur to readers of skill in the art. The creation of such a subscription request may be carried out by an application architect or the like with the support of one or more automation modules. Such automation modules may provide web services, subscription request templates, dynamically generated requests, and so on.

The example modeled governance process (127) of establishing a subscription to a deployed service in the governed SOA in the example of FIG. 6 also includes requesting (624) approval of the subscription request and determining (626) whether approval is received. Requesting (624) approval of the subscription request and determining (626) whether approval is received may be carried out by an Application Architect along with automation modules generated in accordance with the method of FIG. 6.

If approval is received, the example modeled governance process (127) of establishing a subscription to a deployed service in the governed SOA continues by creating (630) a subscription to the deployed service. In the example of FIG. 6, creating (630) a subscription to the deployed service is carried out by storing (632) a subscription profile in a registry and repository.

If approval is not received, the example modeled governance process (127) of establishing a subscription to a deployed service in the governed SOA continues by recommending (628) a different service. Recommending (628) a different service may be carried out by the Provider SOA Architect with support of one or more automation modules. Such automation modules, for example, may search a registry and repository for similar services to the deployed service having service artifacts that appear, upon an initial high-level search, to meet the predefined functional and non-functional requirements. Once a different deployed service is recommended, the governance process (127) of establishing a subscription request may repeat to insure that recommended process indeed satisfies the predefined functional and non-functional requirements.

Figure 7:
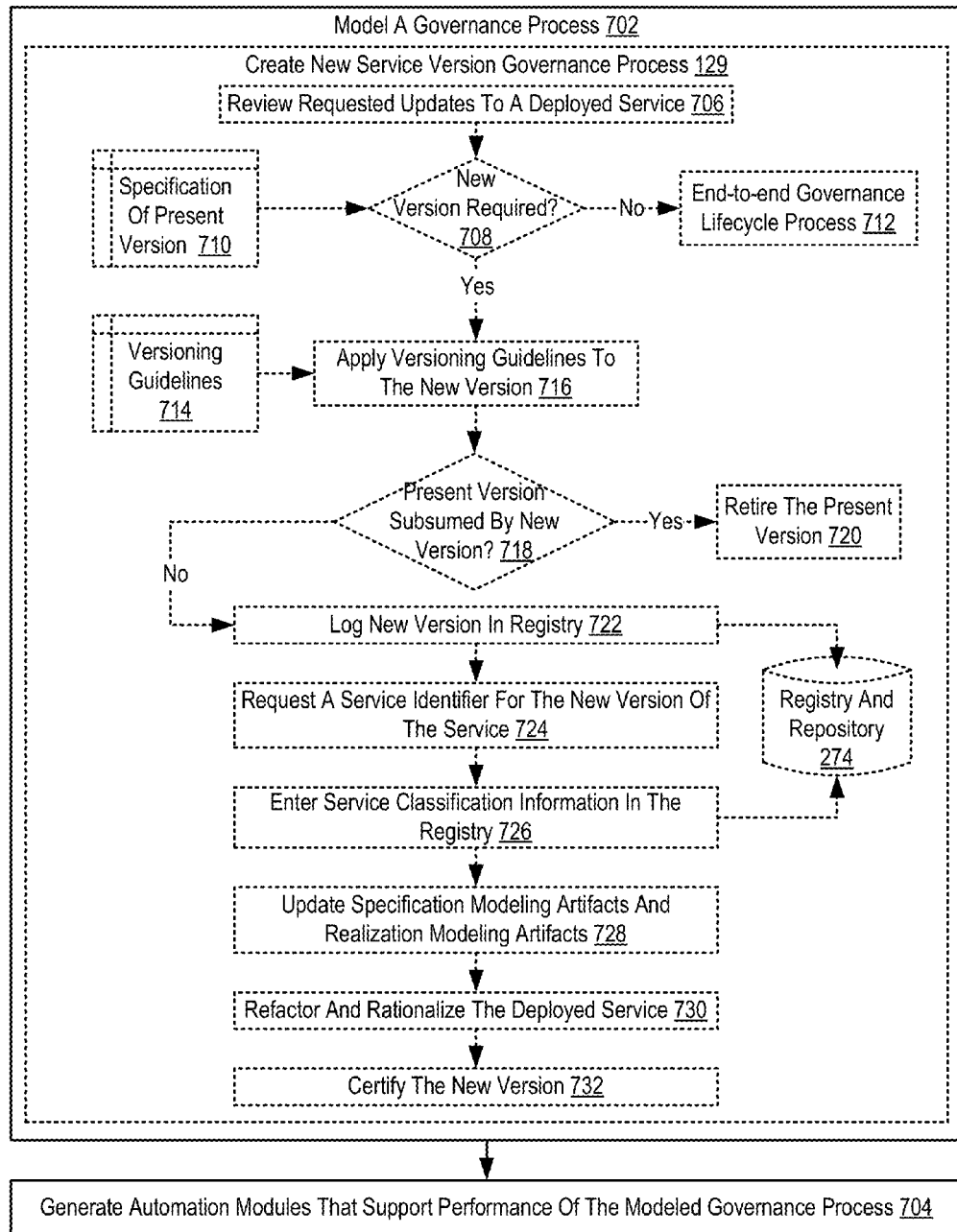
FIG. 7 sets forth a flowchart illustrating an exemplary method of automating a governance process of creating a new version of a service in a governed SOA according to embodiments of the present invention.

For further explanation, FIG. 7 sets forth a flowchart illustrating an exemplary method of automating a governance process of creating a new version of a service in a governed SOA according to embodiments of the present invention. The method of FIG. 7 includes modeling (702) the governance process (129) of creating a new version of a service in a governed SOA and generating (704), in dependence upon the modeled governance process (129), one or more automation modules. In the example of FIG. 7, each automation module may be implemented as a module of computer program instructions that, when executed by a computer processor, supports performance of one or more steps of the modeled governance process (129).

In the method of FIG. 7, the example modeled governance process (129) of creating a new version of a service in a governed SOA includes reviewing requested updates to a deployed service. Reviewing (706) requested updates to a deployed service may include reviewing a service specification (710) of a present version of the deployed service; reviewing a specification of non-functional requirements of the present version of the deployed service; reviewing potential service requirements included in the requested updates; and identifying potential changes to the present version of the deployed service. Reviewing (706) requested updates to a deployed service may be carried out by a Consumer SOA Architect with support of automation modules generated in accordance with the method of FIG. 7. Such automation modules may support performance of reviewing (706) requested updates by retrieving from a registry and repository, a service specification of the present version of the deployed service and providing the service specification to the Consumer SOA Architect and in other ways as will occur to readers of skill in the art.

In the method of FIG. 7, the example modeled governance process (129) of creating a new version of a service in a governed SOA also includes determining (708), in dependence upon the requested updates and a specification (710) of a present version of the deployed service, whether a new version of the deployed service is required. Determining (708) whether a new version of the deployed service is required may be carried out by a Provider SOA Architect in concert with and SOA COC Architect.

If a new version of the deployed service is required, the example modeled governance process (129) of creating a new version of a service in a governed SOA continues by applying (716) versioning guidelines (714) to the new version of the deployed service. Applying versioning guidelines to the new version of the deployed service may include determining whether a version number of the new version of the deployed service is less than a predefined threshold of version numbers for the deployed service and if the version number of the new version of the deployed service is less than the predefined threshold of version numbers for the deployed service, identifying a versioning scheme to follow and identifying a versioning approach. A versioning scheme specifies syntax for version identifiers. Examples of versioning schemes include sequence-based identifiers, data-based schemes, alphanumeric code schemes, and so on as will occur to readers of skill in the art. Examples of versioning approaches include Universal Description Discovery and Integration ('UDDI') as well as namespace approaches and the like.

If a new version of the deployed service is note required, the example modeled governance process (129) of creating a new version of a service in a governed SOA continues by end-to-end governance lifecycle process (712).

The example modeled governance process (129) of creating a new version of a service in a governed SOA also includes determining (718) whether the present version of the deployed service will be subsumed by the new version. Determining (718) whether the present version of the deployed service will be subsumed by the new version may be carried out by determining, by the Provider SOA Architect and SOA COC Architect, whether the new service version increases the number of active versions of the service above a predefined threshold (a maximum) of active versions specified in versioning guidelines. Such determination may be performed with the support of one or more automation modules generated (704) in accordance with the method of FIG. 7.

If the present version of the deployed service will be subsumed by the new version, the example modeled governance process (129) of creating a new version of a service in a governed SOA continues by retiring (720) the present version of the deployed service. A Consumer SOA Architect may initiate the retiring (720) of the present version through use of one or more automation modules generated by the method of FIG. 7.

If the present version of the deployed service will not be subsumed by the new version, the example modeled governance process (129) of creating a new version of a service in a governed SOA continues by logging (722) the new version in a registry and repository. Logging (722) the new version in a registry and repository may be carried out by storing service artifacts, service requirements, and the like in the repository. Logging (722) the new version may be carried out in part by a Service Registrar with support of automation modules generated in accordance with the method of FIG. 7. Such automation modules may be implemented in various ways and support performance of logging (722) in various manners including, for example, by providing a web services interface between the registry and repository and a Service Registrar.

The example modeled governance process (129) of creating a new version of a service in a governed SOA also includes requesting (724) a service identifier for the new version of the service. A service identifier, a version number for example, is an identification of a version of a service relative to other versions of the same service. The Service Registrar may request (724) the service identifier through communications channels established by one or more automation modules generated in accordance with the method of FIG. 7. Upon receipt of the service identifier the Service Registrar may register the new service version in a registry with the new service identifier.

The example modeled governance process (129) of creating a new version of a service in a governed SOA also includes entering (726) service classification information in the registry and repository. In the example modeled governance process (129), the service classification information describes a sector for the new version of the deployed service, a service type for the new version of the deployed service, and a target certification level for the new version of the deployed service. Again, a Service Registrar responsible for activities involving a registry and repository, may carry out the entering (726) of service classification information with the support of automation modules generated in accordance with the method of FIG. 7.

The example modeled governance process (129) of creating a new version of a service in a governed SOA also includes updating (728) specification modeling service artifacts and realization modeling service artifacts of the deployed service, refactoring (730) and rationalizing the deployed service; and certifying (732) the new version of the deployed service. Refactoring is a process of modifying a service without modifying the external functional behavior from the perspective of consumers. Rationalizing the deployed service is a process by which a deployed service's existence, implementation, cost, management and so forth is analyzed and confirmed in accordance with predefined standards. Each of the above steps may be carried out in part by a Provider SOA Architect in concert with a SOA COC Architect and in part by automation modules generated in accordance with embodiments of the present invention.

In view of the explanations set forth above, readers will recognize that the benefits of automating governance processes in a governed SOA according to embodiments of the present invention include:

increasing efficiency of the governance processes;
increasing speed of execution of governance processes;
decreasing costs associated with governance process including monetary costs and labor costs;
providing deterministic, rather than stochastic, governance processes with predictable results;
reducing difficulties in modifying the governance processes;
providing consistent, repeatable processes;
and other benefits as will occur to readers of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of automating a governance process of establishing a subscription to a deployed service in a governed Service Oriented Architecture ('SOA'), the method comprising:
    modeling the governance process of establishing a subscription to a deployed service in the governed SOA, the modeled governance process comprising:
    collecting available service artifacts associated with a deployed service; determining whether the deployed service meets predefined functional requirements including, performing a functional gap analysis between the collected service artifacts and the predefined functional requirements; if the deployed service meets the predefined functional requirements, determining whether the deployed service meets predefined non-functional requirements including: performing a non-functional gap analysis between the collected service artifacts and the predefined non-functional requirements, including determining whether the collective service artifacts associated with the deployed service indicate that the deployed service meets one or more criteria of a Service Level Agreement; if the deployed service meets the predefined non-functional requirements, creating a subscription request; requesting approval of the subscription request; if approval is received, creating a subscription to the deployed service; and if the deployed service does not meet the predefined non-functional requirements, negotiating a change of the predefined non-functional requirements; and
    generating, in dependence upon the modeled governance process, one or more automation modules, each automation module comprising a module of computer program instructions that, when executed by a computer processor, supports performance of one or more steps of the modeled governance process.

2. The method of claim 1, wherein collecting available service artifacts associated with a deployed service further comprises collecting one or more of: service design service artifacts, service development service artifacts, service metadata, and service run-time statistics.

3. The method of claim 1, wherein the modeled governance process further comprises:
    if the deployed service does not meet the predefined functional requirements, initiating the creation of a new service version of the deployed service, the new service version meeting the predefined functional requirements.

4. The method of claim 1, wherein creating a subscription to the deployed service includes storing a subscription profile in a registry and repository.

5. The method of claim 1, wherein the modeled governance processes further comprises recommending a different service if the subscription request is not approved.

6. The method of claim 1, wherein modeling the governance process further comprises:
    modeling, by a process modeling and implementation tool, the governance process in Business Process Expression Language ('BPEL').

7. An apparatus for automating a governance process of establishing a subscription to a deployed service in a governed Service Oriented Architecture('SOA'), the apparatus comprising a computer processor, a computer memory operatively coupled to the computer processor, the computer memory having disposed within it computer program instructions capable of:

modeling the governance process of establishing a subscription to a deployed service in the governed SOA, the modeled governance process comprising:

collecting available service artifacts associated with a deployed service; determining whether the deployed service meets predefined functional requirements including, performing a functional gap analysis between the collected service artifacts and the predefined functional requirements; if the deployed service meets the predefined functional requirements, determining whether the deployed service meets predefined non-functional requirements including: performing a non-functional gap analysis between the collected service artifacts and the predefined non-functional requirements, including determining whether the collective service artifacts associated with the deployed service indicate that the deployed service meets one or more criteria of a Service Level Agreement; if the deployed service meets the predefined non-functional requirements, creating a subscription request; requesting approval of the subscription request; if approval is received, creating a subscription to the deployed service; and if the deployed service does not meet the predefined non-functional requirements, negotiating a change of the predefined non-functional requirements; and generating, in dependence upon the modeled governance process, one or more automation modules, each automation module comprising a module of computer program instructions that, when executed by a computer processor, supports performance of one or more steps of the modeled governance process.

8. The apparatus of claim 7, wherein collecting available service artifacts associated with a deployed service further comprises collecting one or more of: service design service artifacts, service development service artifacts, service metadata, and service run-time statistics.

9. The apparatus of claim 7, wherein the modeled governance process further comprises:

if the deployed service does not meet the predefined functional requirements, initiating the creation of a new service version of the deployed service, the new service version meeting the predefined functional requirements.

10. The apparatus of claim 7, wherein creating a subscription to the deployed service includes storing a subscription profile in a registry and repository.

11. The apparatus of claim 7, wherein the modeled governance processes further comprises recommending a different service if the subscription request is not approved.

12. The apparatus of claim 7, wherein modeling the governance process further comprises:

modeling, by a process modeling and implementation tool, the governance process in Business Process Expression Language ('BPEL').

13. A computer program product for automating a governance process of establishing a subscription to a deployed service in a governed Service Oriented Architecture ('SOA'), the computer program product disposed upon a computer readable storage medium, wherein the computer readable storage medium is not a signal, the computer program product comprising computer program instructions capable, when executed, of causing a computer to carry out the steps of:

modeling the governance process of establishing a subscription to a deployed service in the governed SOA, the modeled governance process comprising:

collecting available service artifacts associated with a deployed service; determining whether the deployed service meets predefined functional requirements including, performing a functional gap analysis between the collected service artifacts and the predefined functional requirements; if the deployed service meets the predefined functional requirements, determining whether the deployed service meets predefined non-functional requirements including: performing a non-functional gap analysis between the collected service artifacts and the predefined non-functional requirements, including determining whether the collective service artifacts associated with the deployed service indicate that the deployed service meets one or more criteria of a Service Level Agreement; if the deployed service meets the predefined non-functional requirements, creating a subscription request; requesting approval of the subscription request; if approval is received, creating a subscription to the deployed service; if the deployed service does not meet the predefined non-functional requirements, negotiating a change of the predefined non-functional requirements; and generating, in dependence upon the modeled governance process, one or more automation modules, each automation module comprising a module of computer program instructions that, when executed by a computer processor, supports performance of one or more steps of the modeled governance process.

14. The computer program product of claim 13, wherein collecting available service artifacts associated with a deployed service further comprises collecting one or more of: service design service artifacts, service development service artifacts, service metadata, and service run-time statistics.

15. The computer program product of claim 13, wherein the modeled governance process further comprises:

if the deployed service does not meet the predefined functional requirements, initiating the creation of a new service version of the deployed service, the new service version meeting the predefined functional requirements.

16. The computer program product of claim 13, wherein creating a subscription to the deployed service includes storing a subscription profile in a registry and repository.

17. The computer program product of claim 13, wherein the modeled governance processes further comprises recommending a different service if the subscription request is not approved.

18. The computer program product of claim 13, wherein modeling the governance process further comprises:

modeling, by a process modeling and implementation tool, the governance process in Business Process Expression Language ('BPEL').

\* \* \* \* \*